United States Patent [19]

Bonfilio et al.

[11] 4,422,685

[45] Dec. 27, 1983

[54] MODULAR CHASSIS AND BODY FOR MOTOR VEHICLES

[76] Inventors: Paul F. Bonfilio, 47-25 198th St., Auburndale, N.Y. 11358; Richard Stobe, 2229 Marcel Dr., Orange Park, Fla. 32073

[21] Appl. No.: 280,345

[22] Filed: Jul. 6, 1981

[51] Int. Cl.³ .............................................. B62D 25/00
[52] U.S. Cl. ................................................... 296/197
[58] Field of Search ...................... 296/197, 1 R, 24 R, 296/178, 193; 298/9, 10, 17 R; 52/582, 584, 578

[56] References Cited

U.S. PATENT DOCUMENTS 4,254,987  3/1981  Leonardis ........................ 296/197

FOREIGN PATENT DOCUMENTS 2471307  6/1981  France ............................ 296/197
2067480  7/1981  United Kingdom ............. 296/197

*Primary Examiner*—Richard A. Bertsch
*Attorney, Agent, or Firm*—Michael Ebert

[57] ABSTRACT

A modular structure formed of components which when assembled define the basic chassis of a motor vehicle, to which chassis is attachable a body in a selected configuration to create an automobile of any desired style. The structure consists of identical front and rear cradles joined to opposing ends of a floor tray, on which seating is mounted. Wheel suspension fixtures are bolted to the cradles to support the wheels of the vehicle. Bumpers are attached to the ends of the cradles, the engine being mounted on either cradle. Overlying the floor tray and secured thereto is a safety capsule having door openings, the capsule acting as a truss for the chassis and functioning as the cockpit section of a body which is completed by a front body section secured to the front cradle and a rear body section secured to the rear cradle.

9 Claims, 14 Drawing Figures

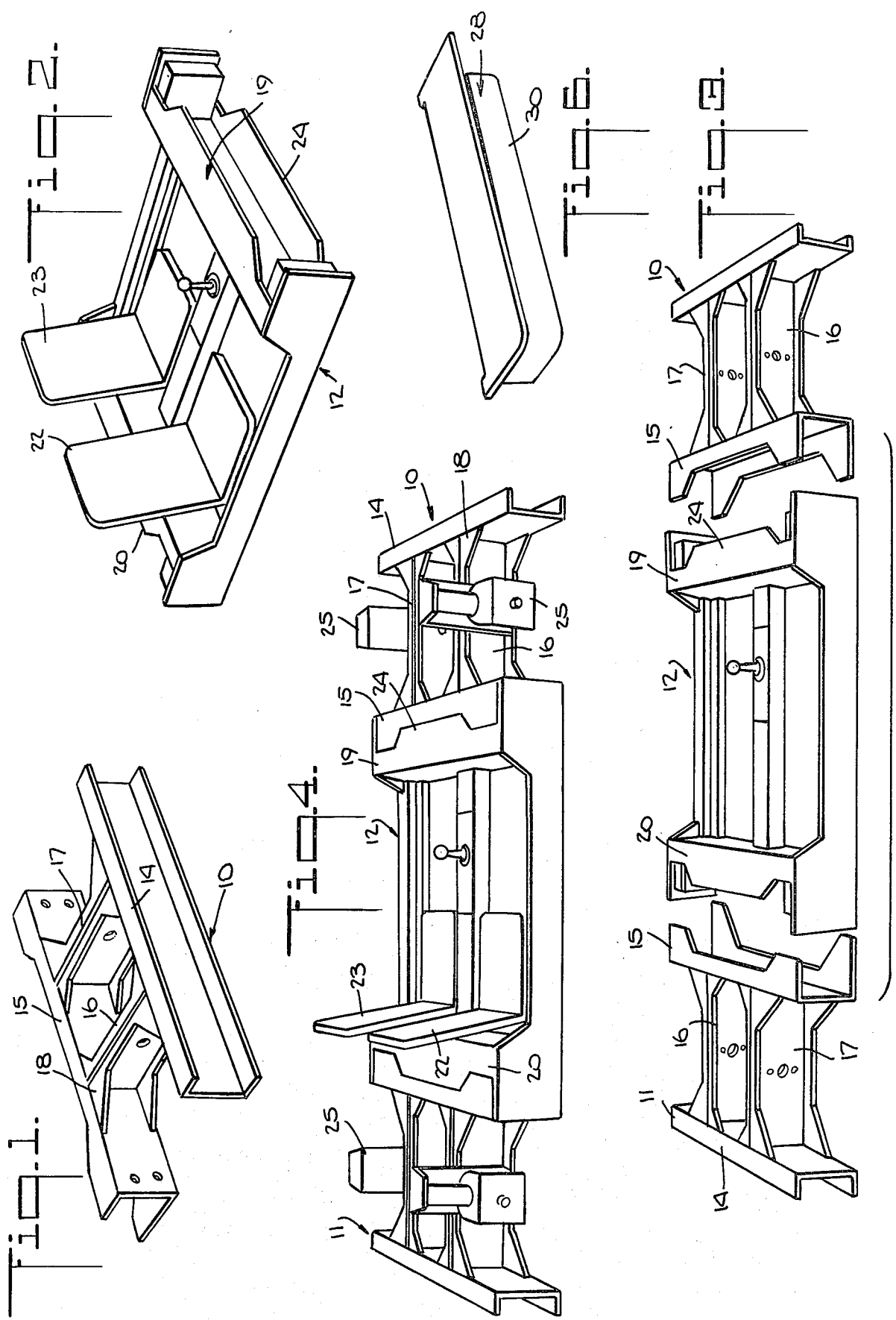

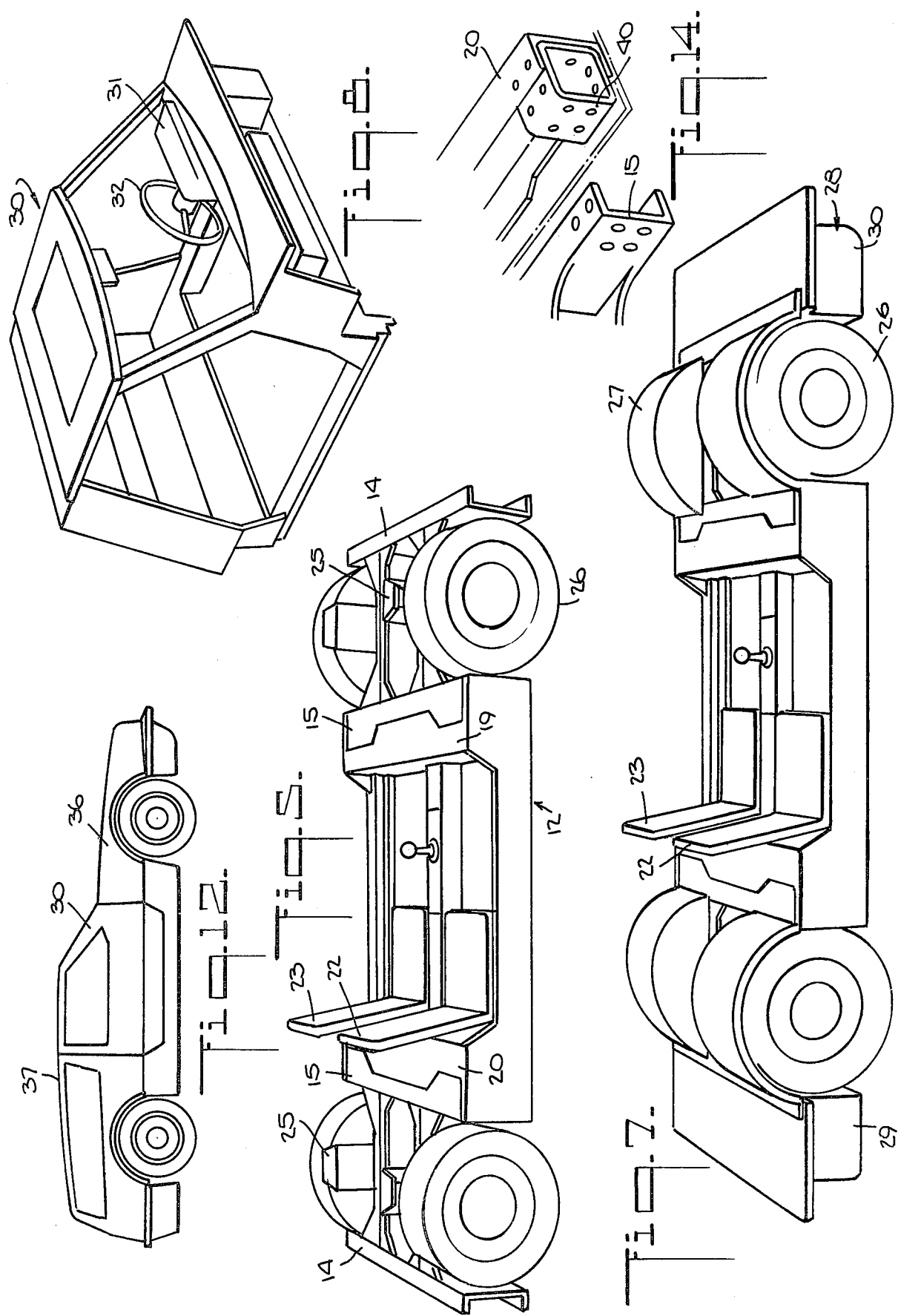

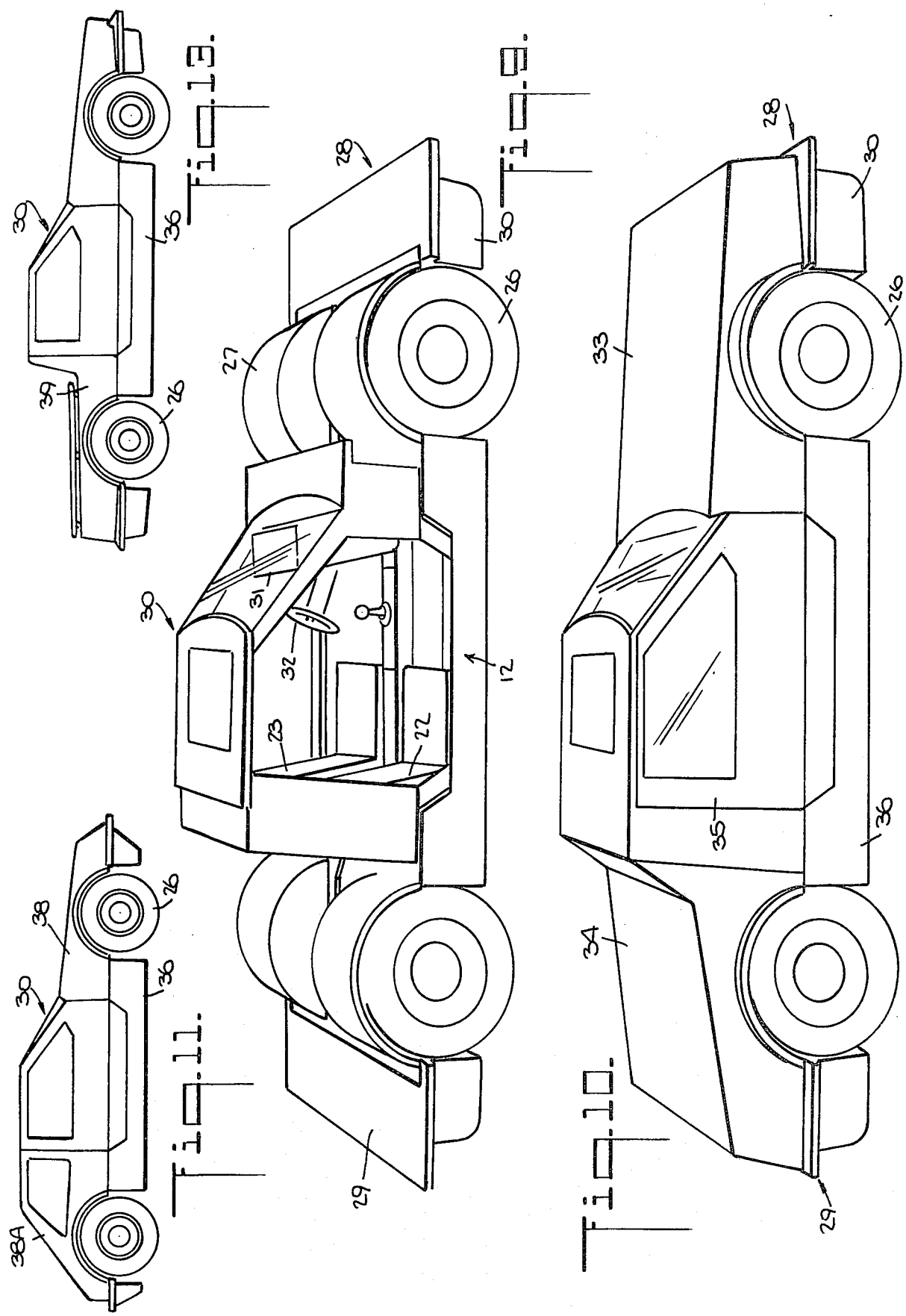

MODULAR CHASSIS AND BODY FOR MOTOR VEHICLES

BACKGROUND OF INVENTION

The present invention relates generally to structures, and in particular to a modular structure formed of components which when assembled define the basic chassis of a motor vehicle, to which may be attached various body forms to create a vehicle of a desired style.

The major elements of an automobile are the chassis on which all other elements are assembled; the running gear; the propulsion means; the body, and various accessories. In the typical motor car, the chassis or structural frame is composed of a network of eye beams and tubular steel members mainly located in a horizontal plane, rigidity being provided by beam action.

The running gear supported on the chassis consists of wheels, springs, axles, brakes and a steering mechanism. In addition to an internal combustion engine supported on the chassis, the propulsion means includes a transmission and a drive shaft to operatively couple the engine to the driven wheels. The body is mounted over the chassis and includes glazing, doors and interior fittings. The accessories are constituted by the radiator, the fuel tank, the defroster and other auxiliaries.

Mass production and assembly line techniques were first introduced in 1917 by the Ford Motor Company. In manufacturing the Model T, the first low-priced vehicle, the chassis, the engine and all other elements of the car were put together at a series of work stations in an assembly plant and then tested; after which the assembly was driven to a site outside the plant where the body was caused to slide down a chute onto the top of the chassis.

After the body was bolted in place, the complete Model T was ready to be driven away. This now seemingly obvious procedure, then represented a radical innovation in manufacturing techniques.

With the sharply rising cost of fuel and growing competition from foreign manufacturers, who have greatly advanced assembly line techniques, American automakers are being subjected to increasing pressure to construct smaller, lighter and more fuel-efficient vehicles. And while the current crop of compact vehicles being manufactured by the major American car makers represent a progressive step in this direction, the paradoxical fact is that these vehicles, despite their reduced size and weight, are nevertheless more expensive than vehicles of traditional size.

The higher cost of modern compact cars cannot entirely be imputed to an inflated economy. These compacts, as presently produced, are essentially small-scale versions of larger vehicles, and their frames and bodies are assembled in basically the same way, for they have not undergone any fundamental structural changes.

For example, one can reduce the weight of a vehicle by substituting high-strength plastic parts for steel and other metal parts, but this does not necessarily result in a significant saving; for not only are petroleum-derived plastics going up in cost, but since the basic structural design of the vehicle is unchanged, assembly costs remain high. Thus the use of a fiberglass-reinforced plastic shell for the body of a car rather than a conventional metal shell makes possible a lighter body, but not a less expensive one. And since existing assembly procedures are labor intensive, it is now more expensive to produce a modern compact car than it was to manufacture a larger vehicle.

The present invention is directed to a modular all-plastic structure which defines both the chassis and body of a vehicle. Relevant to this invention is the White U.S. Pat. No. 2,973,220, in which a plastic car body is formed of molded front and rear sections that are joined together to create the basic structure. Also pertinent is the Porsche U.S. Pat. No. 2,814,524, in which the car body is composed of front, rear and middle sections formed of pressed synthetic sheet material. A plastic chassis frame is disclosed in the patent to Thompson, Jr., U.S. Pat. No. 3,550,948 as, as well as in the Schröder U.S. Pat. No. 3,331,627.

SUMMARY OF INVENTION

In view of the foregoing, the main object of this invention is to provide a modular structure whose components when assembled define a chassis, the same chassis being usable in conjunction with a broad range of different body configurations to create a vehicle of any desired type.

More particularly, an object of this invention is to provide a modular structure of the above type composed of two identical cradles which are bridged by a floor tray to create a chassis for supporting all other elements of the vehicle, the resultant vehicle being light-weight, inexpensive, and relatively easy to service and repair.

Among the significant advantages of a modular structure in accordance with the invention are ease of manufacture and assembly, multiple body styles on the same chassis as well as the ability to ship the components of the structure in the unassembled state to remote sites. Thus the modular structure, whose components are preferably molded or otherwise fabricated of synthetic plastic material, may be manufactured at a central facility and shipped therefrom to assembly plants dispersed throughout the world.

These objects are accomplished in a modular structure in accordance with the invention formed of components which when assembled define the basic chassis of a motor vehicle, to which chassis is attachable a body in a selected configuration to create an automobile of any desired style. The structure consists of identical front and rear cradles joined to opposing ends of a floor tray, on which seating is mounted. Wheel suspension fixtures are bolted to the cradles to support the wheels of the vehicle.

Bumpers are attached to the ends of the cradles, the engine being mounted on either cradle. Overlying the floor tray and secured thereto is a safety capsule having door openings, the capsule acting as a truss for the chassis and functioning as the cockpit section of a body which is completed by a front body section secured to the front cradle and a rear body section secured to the rear cradle.

OUTLINE OF DRAWINGS

For a better understanding of the invention as well as other objects and further features thereof, reference is made to the following detailed description to be read in conjunction with the accompanying drawings, wherein:

FIG. 1 illustrates one of the two cradles included in a modular structure in accordance with the invention to create an automobile chassis;

FIG. 2 shows the floor tray of the modular structure;

FIG. 3 shows how the cradles and floor tray are interconnected to define the chassis;

FIG. 4 illustrates the assembled chassis and the wheel suspension fixtures secured thereto;

FIG. 5 illustrates the chassis with the wheels attached;

FIG. 6 shows one of the bumpers;

FIG. 7 illustrates the chassis with wheel liners in place and the bumpers attached;

FIG. 8 shows the safety capsule of the body;

FIG. 9 shows the safety capsule attached to the assembled chassis;

FIG. 10 shows the completed vehicle including the front and rear sections of the body;

FIG. 11 shows a second version of the body mounted on the same chassis;

FIG. 12 shows a third version of the body;

FIG. 13 shows a fourth version of the body; and

FIG. 14 shows a preferred form of connector.

DESCRIPTION OF INVENTION

Referring now to FIGS. 1, 2 and 3, a modular structure in accordance with the invention is constituted by identical front and rear cradles 10 and 11 which are bridged by a floor tray 12, the assembly defining the basis chassis for an automobile the same chassis being used regardless of the body style.

Each cradle, as best seen in FIG. 1, is composed of parallel channel elements 14 and 15 which are held together by cross beams 16 and 17 in a Roman numeral II configuration, the junction of the cross beams and channel elements being strengthened by strut plates 18. The upper and lower flanges of channel element 15 are indented to accommodate complementary tongues on the floor tray couplers.

The engine, not shown, may be supported on the front or rear cradle, depending on the vehicle design, the other cradle then supporting the trunk of the car. The cradles also provide support for the wheel suspension system and the bumpers.

Floor tray 12 includes a pair of parallel end couplers 19 and 20 between which a floor 21 is extended, seats 22 and 23 resting on the floor. Tray 12 bridges the front and rear cradles, couplers 19 and 20 each being provided with a tongue 24 which interfits with the indentation in the channel element of the associated cradle so that the components of the modular structure neatly mesh together.

The cradles and floor trays are mated at their ends and bolted together to a predetermined torque setting. They can also be linked by the post-tensioning process of the type in the construction industry to tie the beams together and to add further working stresses to pre-case concrete beams. In the chassis, stress is transferred by both the bolts and the shapes and forms of the mated ends.

In practice, all components of the modular structure may be molded or otherwise fabricated of high strength synthetic plastic material such as polycarbonates or high-impact nylon, or they may be made of resin-impregnated fiberglass material. Alternatively, light-weight metals, such as aluminum, honeycomb or laminated materials, may be used to fabricate the cradles and floor tray.

As shown in FIG. 4, in order to support the wheels of the vehicle, bolted to the cross beams 16 and 17 of both steering linkages (not shown) are attached to the cradles at appropriate positions. Wheels 26 are mounted on fixtures 25, as shown in FIG. 5; mounted over the wheels are plastic wheel well liners 27, as shown in FIG. 7, which are screwed into the cradles at the leading and trailing edges of the liners.

Attached to the front and rear of the chassis, as shown in FIG. 7, are identical front and rear bumpers 28 and 29, one of which is shown in FIG. 6. Each bumper is preferably in the form of a urethane foam body covered by vinyl sheeting. A flexible valance 30 made of deformable vinyl is attached below each bumper to serve in front as an air dam, and in the rear to conceal the muffler and exhaust.

Minimal crushing is absorbed by each bumper at the edges. In practice, the foam plastic bumper may be in a variable density formation, the density being made greatest at the rear to provide sufficient rigidity to facilitate its attachment to the cradle.

In the assembled chassis in which the front and rear cradles are bolted to an intermediately-placed floor tray, when the chassis is loaded with an engine and other components, bending stresses are transferred through the bolted connections to the floor tray. These bending stresses are resisted by the safety capsule section 30 of the body which, as shown in FIG. 8, houses a dashboard 31, the steering wheel 32 and storage compartments under the dashboard.

Safety capsule 30, which functions as a cockpit, is mounted over the floor tray and bolted thereto, as shown in FIG. 9. The capsule serves as a reinforcing truss for the chassis, the capsule preferably having integrated therewith roll bars and front and rear impact walls to protect the occupants. The safety capsule completes the structural integrity of the floor tray, for it bolts down into it and thereby bridges stresses around the door openings.

The body is completed by a front body section 33 and a rear body section 34 which fit into the ends of the capsule section. Where the engine is located in the front cradle, the front body section acts as a hood therefor, the rear body section the functioning to house the trunk. But, as will be later evident, the front and rear sections of the body may be differently styled. In the vehicle shown, doors 35 are hinged to the capsule and side panels 36 are provided therebelow to create a two-door coupe.

The arrangement lends itself to any desired body style, such as a station wagon, a pick-up truck, a fastback, a notchback or whatever other style is desired. Thus FIG. 12 shows a car having a safety capsule 30 in conjunction with a front body section 36 and a rear body section 37 in a station wagon format, while FIG. 11 shows a two-door sedan with an appropriate front body section 38 and a rear body section 38A having windows. In FIG. 13, the rear body section 39 creates a pick-up truck. These are but a few examples of the body possibilities. The body sections are preferably in the form of resin-impregnated fiberglass molded shells or other high-strength, light-weight material.

Thus, as distinguished from a conventional vehicle structure, the chassis, instead of being formed of a complex network of bolted or welded-together beams, channel pieces and other structural elements that are difficult and costly to manufacture and assemble, is composed of three preformed modules which are simply bolted together. And because the chassis and the body sections are entirely fabricated of noncorrosive plastic material, no painting is required, for the color is impregnated in the plastic.

The overall weight of a motor car which makes use of a modular chassis and body in accordance with the invention is but a fraction of a conventional vehicle, making it possible to use relatively low horsepower, fuel-efficient engines without sacrificing speed, acceleration and other performance characteristics; for the load imposed on the engine by the structure is markedly reduced.

The relatively few components which make up the chassis and body make it possible to ship these components in the unassembled state to various factories throughout the country or abroad, where the component may be put together at an assembly plant by workers having minimal skills. And because of the sectional nature of the modular structure, any component thereof may be readily replaced when necessary, at low cost.

FIG. 14 shows a preferred form of connector to facilitate coupling of the tray to the front and rear cradles of the structure. Connector 40 is constituted by a collar having a rectangular cross section, all sides of which have an array of holes to receive bolts passing through corresponding holes in the flanges of the components to be joined.

While there has been shown and described a preferred embodiment of a modular chassis and body for motor vehicles in accordance with the invention, it will be appreciated that many changes and modifications may be made therein without, however, departing from the essential spirit thereof. For example, though the structure illustrated herein is described in conjunction with a full scale vehicle intended for factory mass production, it may be supplied in kit form for assembly in home workshops. Also it may be made in small scale toy versions. And while the cradles which are in Roman numeral II form, in practice the central opening therein may be covered by a bottom web plate to resist flexure.

I claim:

1. In an automobile, a modular structure constituted by pre-formed components which when joined together define the basic chassis of a motor vehicle to which is attachable a body of a selected configuration to create an automobile of any desired style, the structure comprising:
   A. a floor tray provided with end couplers and a floor extending therebetween on which seating is mountable;
   B. identical front and rear cradles, each of which is joined to a respective coupler to create a chassis; and
   C. a sectioned body having a capsule section defining a cockpit having door openings, said capsule section being secured to said floor tray to act as a truss for said chassis.

2. In an automobile as set forth in claim 1, therein each cradle is constituted by parallel channel elements held together by a pair of cross beams, one of said elements being joined to a respective end coupler of the floor tray.

3. In an automobile as set forth in claim 2, further including strut plates at the junctions of the channel element and cross beams.

4. In an automobile as set forth in claim 2, further including wheel-supporting fixtures attached to said cross beams.

5. In an automobile as set forth in claim 2, further including a bumper attached to the other of said channel elements.

6. In an automobile as set forth in claim 1, wherein said body further includes a front section secured to said front cradle and a rear section secured to said rear cradle.

7. In an automobile as set forth in claim 5, wherein said bumpers are formed by a foam plastic core covered by a plastic skin.

8. In an automobile as set forth in claim 6, further including an engine mounted in one of said cradles.

9. In an automobile as set forth in claim 8, wherein said engine is mounted on the front cradle and the front body section as a hood therefor.

* * * * *